United States Patent [19]
Kobayashi et al.

[11] 3,821,638
[45] June 28, 1974

[54] HALL EFFECT MEASURING APPARATUS
[75] Inventors: Shunsuke Kobayashi; Takuji Kaneda, both of Saitama, Japan
[73] Assignee: Fuji Photo Film Co., Ltd., Kanagawa, Japan
[22] Filed: Mar. 16, 1973
[21] Appl. No.: 342,244

[30] Foreign Application Priority Data
   Mar. 18, 1972  Japan.............................. 47-27943

[52] U.S. Cl. .............................................. 324/45
[51] Int. Cl. ........................................... G01r 33/06
[58] Field of Search ....................................... 324/45

[56] References Cited
   UNITED STATES PATENTS
   3,189,815   6/1965   Barabutes et al................. 324/45 X
   3,320,541   5/1967   Silverman......................... 324/45 X OTHER PUBLICATIONS
Russell et al., Rev. Sci. Instr; Vol. 21, 1950; pp. 1,028–1,029.

Primary Examiner—Alfred E. Smith
Attorney, Agent, or Firm—Sughrue, Rothwell, Mion, Zinn & Macpeak

[57] ABSTRACT

In the A.C. method of measuring the Hall effect, an identical source is used for both of the bias current source and the alternating magnetic field source so that the bias current and the magnetic field produced are phase-locked. The Hall voltage generated is detected by, e.g., a synchronous rectifier, e.g., a lock-in amplifier, using the reference signal obtained from the above source if the Hall voltage generated is low.

8 Claims, 3 Drawing Figures

PATENTED JUN 28 1974　　　　　　　　　　　　　　3,821,638

3,821,638

HALL EFFECT MEASURING APPARATUS

BACKGROUND OF THE INVENTION

1. Field of the Invention

This invention relates to a Hall effect measuring apparatus of high sensitivity which is principally based on the known A.C. method.

2. Description of the Prior Art

Prior art Hall effect measuring apparatus have not enabled Hall effect measurement under conditions where there is a small effect caused by applying a magnetic field and an electric field, for example, Hall effect measurement under conditions of degeneracy in the material which loses its degeneracy under the influence of a weak magnetic and electric field. Small effect means that for example, in the inspection of the electronic state of GaAs monocrystals at low temperature, if too high a magnetic field and electric field is applied thereto, the state becomes different from the original state and the essential nature of the material to be inspected drastically alters. Therefore, the measurement of the Hall effect (at low magnetic field, at low electric current) of good sensitivity becomes necessary. With respect to this point, the present invention is more sensitive at least by one order than that of ordinary methods of measurement.

It has thus been necessary to measure the Hall effect when the magnetic and electric fields are zero in Hall effect measurements under the condition of degeneracy with prior art apparatus. It is, however, impossible to make measurements in zero fields so that it is necessary to make measurements under conditions approximating the condition of degeneracy as far as possible. For this purpose, measuring equipment is required to have sufficient sensitivity in extremely weak magnetic and electric fields. However, the most sensitive known equipment has a sensitivity of 50 nV, which is insufficient for the above purpose. (P. L. Read and E. Katz, Phy. Rev. Letters, 15 (1960) 466).

In the case of measurements on a material of extremely low Hall mobility, the generally used D.C. method permits a space charge to be caused in the vicinity of an electrode by movement of charged carriers such as ions, so that the desired measurement of the Hall effect is obstructed by the space charge, but the A.C. method does not produce such a space charge and permits the measurement of the Hall effect in such a material.

SUMMARY OF THE INVENTION

It is one object of this invention to provide Hall effect measuring apparatus which enables one to measure Hall effect signals of several nV, i.e., to provide Hall effect measuring apparatus with higher sensitivity than any prior art Hall effect measuring apparatus.

It is a further object of this invention to provide Hall effect measuring apparatus based on the known A.C. method, which enables Hall effect measurement under conditions wherein there is small effect caused by applying magnetic and electric fields, for example, Hall effect measurement under the conditions of degeneracy in a material which is made to lose its degeneracy under the influence of a weak magnetic and electric field.

The Hall effect measuring apparatus according to this invention is based on the A.C. method but an identical source is used for both the bias current source and the alternating magnetic field source to establish a phase-lock relationship between the bias current and the magnetic field. In order to detect the Hall voltage, a synchronous rectifier, e.g., a lock-in amplifier, is supplied with a reference signal obtained from the same source.

The known A.C. method is described in, for example,

1. A new Method for the Measurement of Hall Coefficient B. R. Russel and C. Wahlig, Rev. Sci. Instr. 21, 1028 ('50);

2. Apparatus for measuring the Hall Effect of Low-Mobility Samples at High temperature N. Z. Lupu, N. M. Tallan, and D. S. Tanhauser, Rev. Sci. Instr. 38, 1658 ('67).

In literature reference (1), the term "AC method" was often used. Since the magnetic field and electric current are respectively AC, this method became known as the AC method.

DETAILED DESCRIPTION OF THE INVENTION

Figure 1:
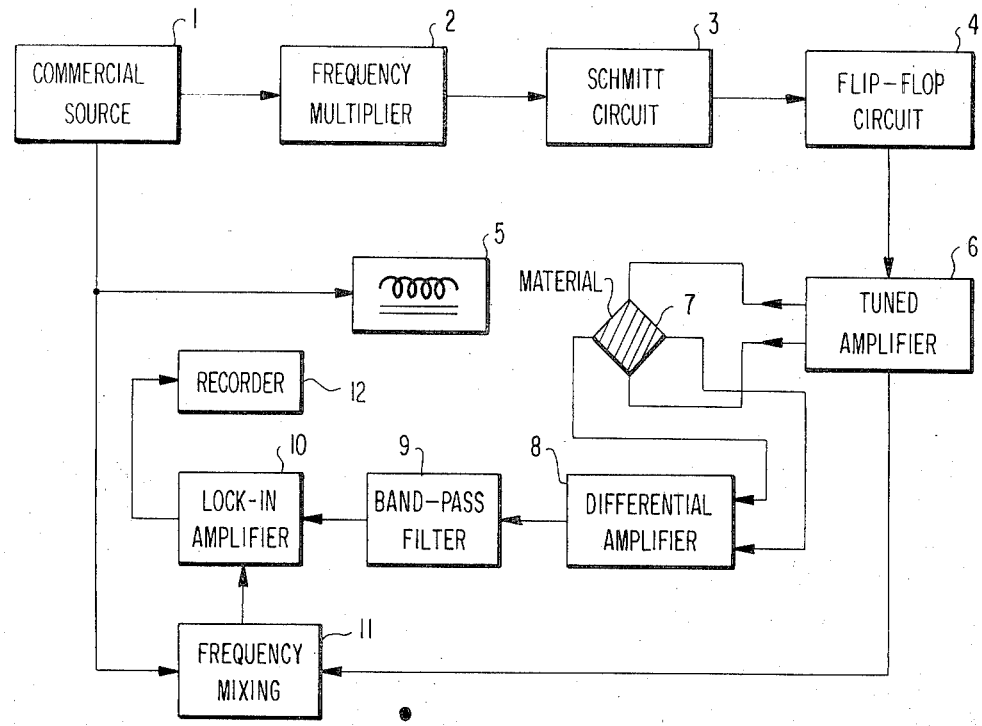
FIG. 1 is schematic diagram of Hall effect measuring apparatus according to this invention.

FIG. 1 shows an embodiment of Hall effect measuring apparatus according to this invention. The output of a commercial source 1 of a frequency $f_1$ is frequency-multiplied into an $nf_1$ signal through frequency multiplier 2. The $nf_1$ signal is converted into an $nf_1/2$ signal by the Schmitt circuit 3 and Flip-Flop circuit 4, and the $nf_1/2$ signal is used as the bias current source. While non-limitative, good results are obtained when $n$ is such to give a 3/2 or 5/2 ratio (e.g., $3f_1$ signal to $3f_1/2$). On the other hand, the same commercial source 1 is used as the source for producing the alternating magnetic field 5. Accordingly, the bias current source and the alternating magnetic field source 5 are phase-locked with each other.

In general, the Hall voltage $V_H$ is given by $$V_H \quad H_0 \cos f_1 t \cdot I_0 \cos (f_2 t + 0) = H_0 I_0/2 [ \cos (f_1 + f_2)t + 0 + \cos (f_1 - f_2)t - 0 ]$$

where $H_0$ and $f_1$ are strength and frequency of the magnetic field, $I_0$ and $f_2$ are strength and frequency of the bias/current, $t$ is the time and 0 is the phase difference between the magentic field and bias current. Then, either of the Hall voltages with frequency $f_1 + f_2$ or $f_1 - f_2$ is detected in lock-in amplifier 10, i.e., $\cos (f_1 + f_2)t + 0$ or $\cos (f_1 - f_2)t - 0$ is detected by lock-in amplifier, and is made two times and then every term with respect to time is detected. In general, it is better to detect the plus frequency $(f_1 + f_2)$ by the lock-in amplifier, because the higher the frequency the shorter is the detecting time.

In the lock-in amplifier 10, by supplying a reference signal which has the same frequency as that of the signal to be detected and is synchronized in phase with the signal, only the desired frequency component is detected. This is due to the nature of the lock-in amplifier. A lock-in amplifier detects only signals of a predetermined phase and a predetermined frequency, and when the frequency that is to be detected is inserted, only a frequency equal to that frequency is detected. The reference signal is not always necessary, that is, it is unnecessary if the signal to be detected is sufficiently large. This is also due to the nature of lock-in amplifiers. That is to say, when the signal is more than about 100 mmV, the signal itself works as a reference signal. But, when the signal is lower, for example, at nV levels, the reference signal is necessary. In other words, the reference signal is not used for increasing the sensitivity. Thus, as shown in FIG. 1, a reference signal of the frequency $f_1 + f_2$ or $f_1 - f_2$ is supplied to the lock-in amplifier 10 in order to increase the sensitivity. The reference signal is obtained by frequency-mixing the outputs of the alternating magnetic field source and the bias current source in frequency-mixing means 11 which serves as a reference signal generator.

For example, when a signal on the order $10^{-9}$V(nV) is detected, a reference signal of matched phase for lock-in amplifier is used, and frequency $(f_1 + f_2)$ or $(f_1 - f_2)$ is derived from a commercial electric source and is used as the reference signal.

Four electrodes are attached to the material 7 the Hall effect of which is to be measured, two of which (oppositely facing) are input terminals connected to tuned amplifier 6 and the other two of which (oppositely facing) are output terminals. The output terminals are connected to low-noise differential amplifier 8, and then through band-pass filter 9 to the lock-in amplifier 10 so as to detect the Hall voltage signal. If desired, the Hall voltage signal can be recorded in recorder 12.

The Hall effect measuring apparatus according to this invention can detect a Hall voltage of several nV.

The Hall effect measuring apparatus is, furthermore, based on the A.C. method, so that it permits Hall effect measurement on substances which permit a space charge to be caused in the vicinity of electrodes due to the movement of a charged carrier, e.g., ions, in the material 7 or with materials which have an extremely low Hall mobility.

Figure 3:
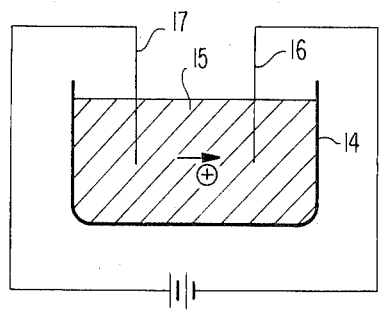
FIG. 3 illustrates the situation in an electrolytic solution.

For example, as is apparent from electrolysis in solution 15 as shown in FIG. 3, positive ions in electrolyte 15 move to negative electrode 16 and are discharged so that the resulting atoms adhere to the negative electrode 16. An amount of positive ions which cannot be discharged, however, is succesively attracted to the negative electrode 16, so that the vicinity thereof becomes positively charged. The generated positive space charge creates a repulsive force upon succeeding positive ions which causes a decrease in electric conductivity. This phenomenon occurs in the D.C. method and obstructs Hall effect measurement. In greater detail, when a DC source is applied to the solution including electrolytic therein as shown in FIG. 3, the bias current will decrease with lapse of time. In the case of AC current, there is little change with time, as expalined below.

In the Hall effect measuring apparatus according to this invention, which is based on the A.C. method, however, ions do not gather in the vicinity of the negative electrode 16 and accordingly Hall effect measurement is not obstructed.

Furthermore, the Hall effect measuring equipment according to this invention has very high sensitivity, that is, it requires only a small magnetic field and bias current for the measurement. For example, it is therefore possible to measure the Hall effect under conditions of degeneracy even for a material which loses its degeneracy under the influence of a weak magnetic and electric field.

All elements used can be commercially purchased or fabricated by the use. For example, magnetic field source 5 can comprise a brass pipe (12 mm diameter) wrapped with a Cu tape (0.5 mm thickness; 20 mm width; 1,600 or more turns) on a thin Mylar base as an insulating material sealed with PARMALLOY, etc. (Magnetic insulating material) so that the magnetic field does not leak to places other than the Cu tape wrapped portions.

The differential amplifier used is preferably such that the noise level is $10^{-8}$V or less, and the band pass filter is preferably such that the noise level is $10^{-7}$V or less, and the lock in amplifier should be such that 1 n V can be detected without fail.

These are matters easily discernible to one skilled in the art in light of the present specification.

The following EXAMPLES will serve to further illustrate this invention.

EXAMPLE 1

Figure 2:
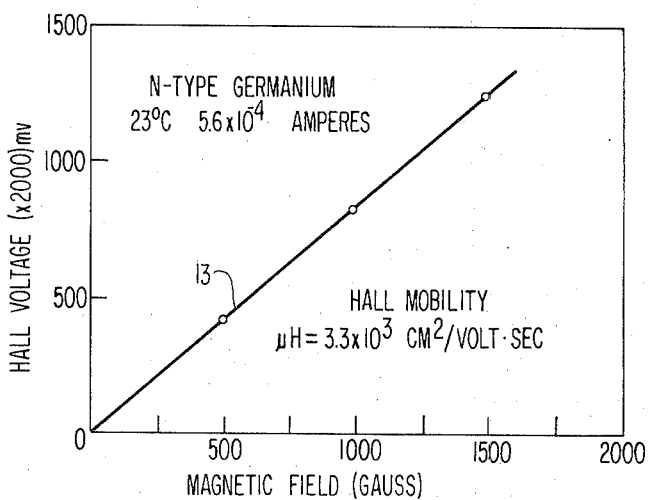
FIG. 2 shows an example of the Hall effect measurement on N-type germanium obtained using the measuring apparatus of this invention.

From a commercial source of a frequency $f_1$ of 50 Hz, a 150 Hz signal is obtained and then converted into a 75 Hz ($f_2$) bias current through a Schmitt circuit and a Flip-Flop circuit. Applying the bias current and magnetic field to the material to be measured, a 125 Hz signal is detected. FIG. 2 shows a plot 13 of the magnetic field versus the Hall voltage measured at room temperature on N-type germanium which has a specific resistance of about 5Ω-cm at room temperature. The bias current is $5.6 \times 10^{-4}$ amperes (peak-to-peak).

Calculating the Hall mobility $\mu$ from the data, using the formula $$R_h = 2 \times 10^{-8} \cdot V_h \cdot d / HI$$

$$\mu = R_h \cdot \sigma$$

where $R_h$ is Hall coefficient; $V_h$ is Hall voltage; $d$ is the thickness of the sample; $H$ is the magnetic field strength; $I$ is the bias current strength; $\mu$ is Hall mobility; and $\sigma$ is electric conductivity. The following experimental values were determined:

$I=5.6\times10^{-4}$A; $H=1,000$ gauss; $V_h=0.4$mV; $d=0.1$cm; $\sigma=0.2(\Omega\cdot\text{cm})^{-1}$; give $\mu=3.3\times10^3$ cm$^2$/volt.sec. This value is identical with the value obtained by the known D.C. method.

EXAMPLE 2

The Hall effect of Ag$^+$ ions in a RbAg$_4$I$_5$ single crystal was measured. This measurement requires extremely sensitive measuring apparatus which is able to detect a voltages of 2 to 3 nV because the carriers are ions, i.e., they have very low mobility. In addition, it is difficult to accomplish such a measurement by the known D.C. method because it is possible that a space charge will be produced in the vicinity of electrode. However, according to the measuring apparatus of this invention, measurement was successfully accomplished because of the inherent high sensitivity and the lack of production of a space charge area.

The Hall mobility of Ag$^+$ ions in a RbAg$_4$I$_5$ single crystal was measured under the conditions magnetic field: 2,000 gauss bias current: $8 \times 10^{-5}$ amperes
temperature: 27°C, as
$\mu = 5 \times 10^{-2}$ cm²/vol. sec.

Hall effect measurement on positive ions in a solid at room temperature has not been possible prior to the present invention, but according to this invention it is possible to detect the Hall effect of cations in a solid at room temperature.

In Example 1 and in Example 2, $f_1=50H_z$, $f_2=3/2f_1$, and $f_2=75H_z$.

While the invention has been described in detail and with reference to specific embodiments thereof, it will be apparent to one skilled in the art that various changes and modifications can be made therein without departing from the spirit and scope thereof.

What is claimed is:

1. Hall voltage measuring apparatus comprising:
   an alternating current power source of a frequency $f_1$;
   means driven by said power source for generating an alternating magnetic field at frequency $f_1$;
   means for generating a bias current and driven by said power source via means for multiplying the frequency $f_1$ to a frequency $f_2$, where $f_2 = nf_1$, $n$ not being an integer, whereby the alternating magnetic field and the means for generating the bias current are phase locked;
   means for applying said bias current to a sample whose Hall voltage is to be measured while said sample is in said alternating magnetic field, whereby a Hall voltage output of a frequency of $f_1 + f_2$ or $f_1 - f_2$ is generated;
   reference signal generating means for mixing signals of the frequencies $f_1$ and $f_2$ and generating a reference signal;
   synchronous rectifying means responsive to said output from the sample and to said reference signal for synchronously rectifying said output to provide an output signal; and
   indicating means for receiving and displaying said output signal, whereby the Hall voltage is determined.

2. Hall voltage measuring apparatus as in claim 1 further comprising a band pass filter with a center frequency of $f_1 + f_2$ or $f_1 - f_2$ receives said Hall voltage output, whereafter the Hall voltage of the desired frequency is passed as an output therefrom.

3. Hall voltage measuring apparatus as in claim 2 where said Hall voltage output is passed through a low noise differential amplifier, whose output comprises the input to said band pass filter.

4. Hall voltage measuring apparatus as in claim 3 wherein said synchronous rectifying means is a lock in amplifier.

5. Hall voltage measuring apparatus as in claim 4 wherein said means for multiplying the frequency $f_1$ comprises a frequency multiplier, a Schmitt circuit and a Flip-Flop circuit.

6. Hall voltage measuring apparatus as in claim 5 wherein the Hall voltage passed by said band pass filter is of the freqeuncy $f_1 + f_2$.

7. Hall voltage measuring apparatus as in claim 3 wherein said display means is linked to recording means, whereby the Hall voltage is recorded.

8. Hall effect measuring apparatus based on the A.C. method comprising;
   sources with a frequency $f_1$ and a frequency $f_2 = nf_1$ where $n$ is not an integer, which sources are phase-locked with each other,
   magnetic field generating means driven by said source with a frequency $f_1$,
   means for supplying a bias current to a material whose Hall effect is to be measured from said source with a frequency $f_2$,
   band pass filter means with a center frequency of $f_1 + f_2$ or $f_1 - f_2$ for passing Hall voltage signals from said material,
   reference signal generating means in which signals of frequency $f_1$ and $f_2$ are mixed, and
   means for synchronously rectifying the output of said band pass filter with said reference signal so as to detect Hall voltages.

* * * * *